United States Patent
Bichot et al.

(10) Patent No.: US 11,115,498 B2
(45) Date of Patent: Sep. 7, 2021

(54) MULTI-PATH MANAGEMENT

(71) Applicant: INTERDIGITAL CE PATENT HOLDINGS, Paris (FR)

(72) Inventors: Guillaume Bichot, La Chapelle Chaussee (FR); Stephane Gouache, Cesson-Sevigne (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/456,968

(22) Filed: Jun. 28, 2019

(65) Prior Publication Data

US 2020/0007653 A1 Jan. 2, 2020

(30) Foreign Application Priority Data

Jun. 28, 2018 (EP) .................................. 18305828

(51) Int. Cl.
*H04L 29/08* (2006.01)
*G06F 9/48* (2006.01)
*H04L 12/707* (2013.01)
*H04L 29/06* (2006.01)

(52) U.S. Cl.
CPC .......... *H04L 67/325* (2013.01); *G06F 9/4881* (2013.01); *H04L 45/24* (2013.01); *H04L 67/02* (2013.01); *H04L 67/06* (2013.01); *H04L 67/141* (2013.01); *H04L 67/42* (2013.01); *H04L 69/326* (2013.01); *H04L 69/325* (2013.01); *H04L 69/329* (2013.01)

(58) Field of Classification Search
CPC ..... G06F 9/4881; H04L 67/325; H04L 45/24; H04L 67/02; H04L 67/06; H04L 67/141; H04L 67/42; H04L 69/326
See application file for complete search history.

(56) References Cited

U.S. PATENT DOCUMENTS

| | | | |
|---|---|---|---|
| 7,568,034 B1* | 7/2009 | Dulitz | G06F 9/5033 709/226 |
| 8,640,174 B2 | 1/2014 | Salkintzis et al. | |
| 2004/0221065 A1* | 11/2004 | Banerjee | H04L 67/1095 709/250 |
| 2014/0082117 A1* | 3/2014 | Unhale | H04L 63/0876 709/208 |
| 2015/0271233 A1* | 9/2015 | Bouazizi | H04N 21/44209 709/219 |
| 2015/0358236 A1* | 12/2015 | Roach | H04L 41/0896 370/235 |

(Continued)

OTHER PUBLICATIONS

"Juhoon Kim, Ramin Khalili, Anja Feldman, Yung-Chin Chen, Don Towsley, Multi-Source Multipath HTTP (mHTTP): A Proposal, Dec. 10, 2013, Section 1-6" (Year: 2013).*

(Continued)

*Primary Examiner* — Nicholas R Taylor
*Assistant Examiner* — Christopher B Robinson
(74) *Attorney, Agent, or Firm* — Volpe Koenig

(57) ABSTRACT

A mechanism allowing a client application at a client device to operate multiple connection paths with a transfer protocol by implementing a master connection at an application layer and slave connections at a network layer, wherein requests for resources associated with the master connection are distributed over the slave connections established on distinct network interfaces of the client device.

24 Claims, 5 Drawing Sheets

(56) References Cited

U.S. PATENT DOCUMENTS

| | | | |
|---|---|---|---|
| 2016/0262080 A1* | 9/2016 | Rinne | H04W 40/02 |
| 2017/0290036 A1 | 10/2017 | Han et al. | |
| 2017/0346725 A1 | 11/2017 | Lapidous et al. | |
| 2018/0139255 A1* | 5/2018 | Numakami | G06F 8/65 |
| 2018/0212883 A1 | 7/2018 | Wei et al. | |

OTHER PUBLICATIONS

Belshe et al., "Hypertext Transfer Protocol Version 2 (HTTP/2)," Internet Engineering Task Force (IETF), RFC 7540 (May 2015).

Jin et al., "Aggregating LTE and WiFi: Toward Intra-Cell Fairness and High TCP Performance," IEEE Transactions on Wireless Communications, vol. 16, No. 10 (Oct. 2017).

Kaspar et al., "Using HTTP Pipelining to Improve Progressive Download over Multiple Heterogeneous Interfaces," IEEE International Conference on Communications (Jun. 2010).

Kim et al., "Multi-Source Multipath HTTP (mHTTP): A Proposal," arXiv:1310.2748v3 (Dec. 2013).

Zhang et al., "Implementation of Multi-Stream Concurrent Download on Multi-Interface Terminal," (Nov. 2012).

\* cited by examiner

MULTI-PATH MANAGEMENT

REFERENCE TO RELATED EUROPEAN APPLICATION

This application claims priority from European Patent Application No. 18305828.8, entitled "Multi-Path Management", filed on Jun. 28, 2018, the contents of which are hereby incorporated by reference in its entirety.

FIELD

The present disclosure relates to the technical field of Internet technology and, more particularly, to the field of web site browsing.

BACKGROUND

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that, these statements are to be read in this light.

The hypertext transfer protocol (HTTP) is designed to allow intermediate network elements to improve or enable communications between clients and servers. HTTP functions as a request-response protocol in the client-server computing model. This general principle is illustrated in FIG. 1. A web browser is arranged at the client 10. A computer hosting a website is referred to be the server 20. The client 10 transmits an HTTP request message to the server 20. The server 20, which provides resources such as HTML files and other content like video clips, audio files, style sheets, Java scripts, etc., returns a response message to the client 10. The response contains the requested content in its message body and completion status information about the request in a header.

HTTP is an application layer protocol designed within the framework of the Internet protocol suite. Its definition presumes an underlying and reliable transport layer protocol. Here, the Transmission Control Protocol (TCP) is commonly used.

HTTP resources are identified and located on the network by Uniform Resource Locators (URLs), using the Uniform Resource Identifiers (URI's) schemes http and https. URIs and hyperlinks in HTML documents form inter-linked hypertext documents. A URL is a specific type of Uniform Resource Identifier (URI). With the URL the web address information is transferred to the server from which the requested resource is requested. In the known manner such web address will be translated into the destination IP address and port number.

HTTP/1.1 is a revision of the original HTTP (HTTP/1.0). In HTTP/1.0 a separate connection to the same server is made for every resource request. HTTP/1.1 can reuse a connection multiple times to download images, scripts, stylesheets, etc. after the page has been delivered. HTTP/1.1 communications therefore experience less latency as the establishment of TCP connections presents considerable overhead.

In particular, HTTP/1.0 allows only one request to be outstanding at a time on a given TCP connection. HTTP/1.1 adds request pipelining, but this only partially addresses request concurrency and still suffers from head-of-line blocking. Therefore, HTTP/1.0 and HTTP/1.1 clients that need to make many requests use multiple connections to a server in order to achieve concurrency and thereby reduce latency.

Furthermore, HTTP header fields are often repetitive and have long character strings, causing unnecessary network traffic as well as causing the initial TCP congestion window to quickly fill. This can result in excessive latency when multiple requests are made on a new TCP connection.

HTTP/2 enables a more efficient use of network resources and a reduced perception of latency by introducing header field compression and allowing multiple concurrent exchanges on the same connection.

An HTTP client initiates a request by establishing a Transmission Control Protocol (TCP) connection to a particular port on a server (typically port 80). An HTTP server listening on that port waits for a client's request message. Upon receiving the request, the server sends back a status line, such as "HTTP/1.1 200 OK", and a message of its own. The body of this message is typically the requested resource, although an error message or other information may also be returned.

HTTP version 2.0 is specified in the IETF document Request for Comments RFC 7540. Most of today's browsers are already designed for the new version. HTTP/2 brings significant evolutions comparing with HTTP 1.1 that should impact the whole internet paradigm and in particular, the video streaming. One key feature is the possibility to download in parallel multiple objects through concurrent "streams" within the same single permanent connection. Streams can be closed without impacting the associated connection.

Besides, multipath communication is about sending data over at least two separate interfaces. This can be managed at different levels or layers:
  on the top, at the application layer, it is called for instance multipath distributed HTTP adaptive streaming wherein the HTTP requests are distributed among several paths. Inconvenient of that solution is that the application must be aware of the multiple paths characteristics. The segment requests are sent over one or several paths depending on the client's application requirements. In addition, the solution impacts potentially the server side. The content can be duplicated to several servers allowing the client to distribute its requests among the communication paths established between itself and the plurality of servers. Alternatively, there may be one server and the client having multiple network interfaces;
  at the transport layer, it is called Multi-path TCP (MPTCP), a protocol that aggregates several TCP connections transparently for the application. The drawback is that the application has no control on the packet scheduling algorithm and if MPTCP is not supported in end-devices (terminal, server), there is the need of a proxy gateway that bridges a TCP connection with MPTCP and vice-versa. This proxy is typically hosted in the residential gateway and in an aggregator device in the network;
  at the IP layer (Multi-path routing) wherein the distribution of packets among the communication interfaces/paths is done on a flow basis. As a remark, a flow or packet flow is identified thanks to the following quadruplet: destination and source IP address, destination and source transport (UPD or TCP) port number.

The present disclosure has been devised with the foregoing in mind.

SUMMARY

According to one or more embodiments, there is provided a client device, comprising:
- at least two network interfaces for sending messages to a server based on a transfer protocol;
- at least one processor configured for:
  - upon requests for resources from said server, establishing a master connection with said server at an application layer by creating at least two slave connections at a network layer, wherein each slave connection is bound to one of said at least two network interfaces;
  - performing a scheduling operation for distributing requests to said server over the at least two slave connections.

According to one or more embodiments, there is provided a method for data communication between a client device and a server based on a transfer protocol, wherein the client device is equipped with at least two network interfaces, said method comprising:
- upon requests for resources from said server, establishing a master connection with said server at an application layer by creating at least two slave connections at a network layer, wherein each slave connection is bound to one of said at least two network interfaces;
- performing a scheduling operation for distributing requests to said server over the at least two slave connections.

According to one or more embodiments, there is provided a computer program product at least one of downloadable from a communication network and recorded on a non-transitory computer readable medium readable by at least one of computer and executable by a processor, comprising program code instructions for implementing a method for data communication between a client device and a server based on a transfer protocol, wherein the client device is equipped with at least two network interfaces, said method comprising:
- upon requests for resources from said server, establishing a master connection with said server at an application layer by creating at least two slave connections at a network layer, wherein each slave connection is bound to one of said at least two network interfaces;
- performing a scheduling operation for distributing requests to said server over the at least two slave connections.

According to one or more embodiments, there is provided a non-transitory program storage device, readable by a computer, tangibly embodying a program of instructions executable by the computer to perform a method for data communication between a client device and a server based on a transfer protocol, wherein the client device is equipped with at least two network interfaces, said method comprising:
- upon requests for resources from said server, establishing a master connection with said server at an application layer by creating at least two slave connections at a network layer, wherein each slave connection is bound to one of said at least two network interfaces;
- performing a scheduling operation for distributing requests to said server over the at least two slave connections.

The methods according to the one or more embodiments may be implemented in software on a programmable apparatus. They may be implemented solely in hardware or in software, or in a combination thereof.

Some processes implemented by elements of the one or more embodiments may be computer implemented. Accordingly, such elements may take the form of an entirely hardware embodiment, an entirely software embodiment (including firmware, resident software, microcode, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements can be implemented in software, some aspects of the embodiments can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like.

The one or more embodiments thus provide a computer-readable program comprising computer-executable instructions to enable a computer to perform above mentioned method.

Certain aspects commensurate in scope with the disclosed embodiments are set forth below. It should be understood that these aspects are presented merely to provide the reader with a brief summary of certain forms the one or more embodiments might take and that these aspects are not intended to limit the scope of the disclosure. Indeed, the disclosure may encompass a variety of aspects that may not be set forth below.

BRIEF DESCRIPTION OF THE DRAWINGS

The proposed method and apparatus is best understood from the following detailed description when read in conjunction with the accompanying drawings. The drawings include the following figures briefly described below.

Figure 1:
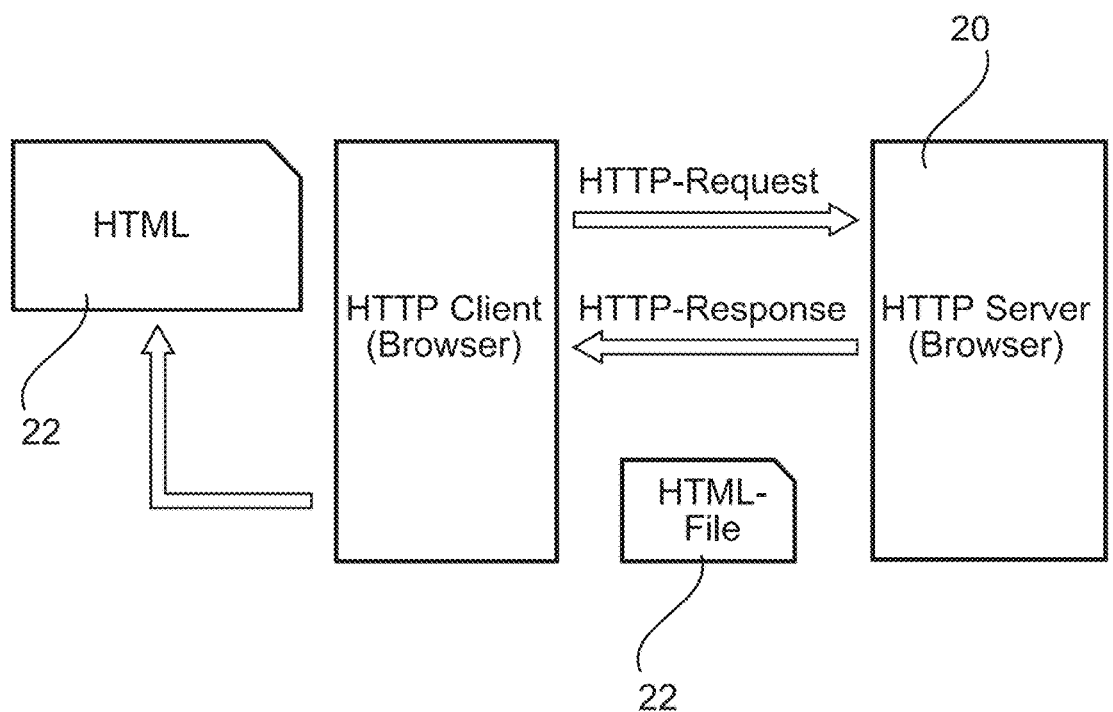
FIG. 1 is a diagram showing the principle of a request-response protocol which is used for HTTP transactions.

It should be understood that, the drawing(s) are for purposes of illustrating the concepts of the disclosure and is not necessarily the only possible configuration for illustrating the disclosure.

DETAILED DESCRIPTION

The following description illustrates some embodiments. It will thus be appreciated that those skilled in the art will be able to devise various arrangements that, although not explicitly described or shown herein, embody some aspects of the embodiments and are included within their scope.

All examples and conditional language recited herein are intended for educational purposes to aid the reader in understanding the embodiments and are to be construed as being without limitation to such specifically recited examples and conditions.

Moreover, all statements herein reciting embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying some aspects of the embodiments. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

In the claims hereof, any element expressed as a means and/or module for performing a specified function is intended to encompass any way of performing that function including, for example, a) a combination of circuit elements that performs that function or b) software in any form, including, therefore, firmware, microcode or the like, combined with appropriate circuitry for executing that software to perform the function. It is thus regarded that any means that can provide those functionalities are equivalent to those shown herein.

In addition, it is to be understood that the figures and descriptions of the present disclosure have been simplified to illustrate elements that are relevant for a clear understanding of the present embodiments, while eliminating, for purposes of clarity, many other elements found in typical digital multimedia content delivery methods, devices and systems. However, because such elements are well known in the art, a detailed discussion of such elements is not provided herein. Embodiments herein are directed to all such variations and modifications known to those skilled in the art.

The present disclosure proposes a mechanism allowing a HTTP/2 client application (e.g. a browser) to operate multiple connection paths in a transparent way. The HTTP/2 connection as defined by the RFC 7540 document is established with one server and is associated with multiple TCP connections (involving multi-homed interfaces). An abstraction layer opens basically a TCP connection per available network interface and schedules HTTP/2 streams forwarding operations over these connections. This solution is fully transparent to the server. The server accepts the multiple connections as independent connections and treats the streams related to each connection separately. On the client side, there is a need of an abstraction layer in order to hide the usage of such multiple paths from the browser.

Figure 2:
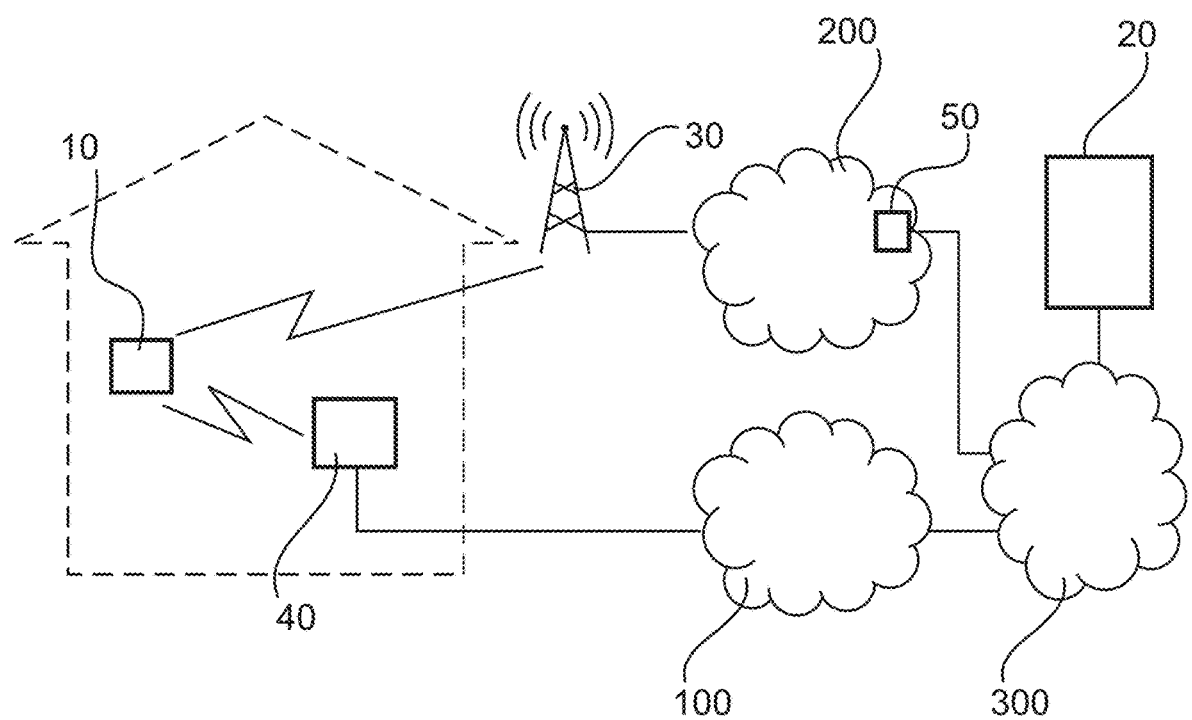
FIG. 2 shows the concept of multi-homing when communicating with a server.

FIG. 2 shows the principle of multi-homing. A presumption for multi-homing is that a device comprises at least two network interfaces via which different network connections can be established. Each network interface has its own IP address so that packets destined to the multi-homing device will be independently routed. The multi-homing client in FIG. 2 is labeled with reference sign 10. It is equipped with WLAN interface circuitry on one hand and mobile communication interface circuitry on the other hand. Such mobile communication interface circuitry may be compliant with the LTE (Long Term Evolution) mobile communication system or the like. Examples of such multi-homing clients are smart phones, tablet computers, PC's or laptop computers. There exist other devices such as a vehicle which may also be equipped with different interfaces, e.g. WLAN and LTE interface in the same manner, and can also be regarded as a multi-homing device. The WLAN interface circuitry allows to associate the multi-homing device 10 with the home network. There is a residential gateway 40 at home which serves as an Internet access point for the multi-homing client 10. With the LTE interface when logged on to a mobile communication provider there is a direct access to the Internet possible. FIG. 2 shows the two different communication paths involved in multi-homing. The client 10 when downloading content from a remote server 20 receives data packets over the two communication paths. All the packets be it in downstream direction or upstream direction will be routed in Internet 300. There are different reference signs 100, 200 for the WAN network since other communication techniques may be used. Where the first mile from the residential gateway 40 to WAN network 100 is bridged with DSL or broadband cable or fiber cable technology, for the top path the first mile is bridged with wireless communication, e.g. LTE air interface technology, the next section up to the Internet 300 is bridged with some other technology, e.g. the Evolved Packet Core EPC 200.

For the downstream direction finally the packets will be routed to the residential gateway 40 for delivery to the client's WLAN interface or to the base station 30 of the mobile communication system for delivery to the client's LTE interface.

Figure 3:
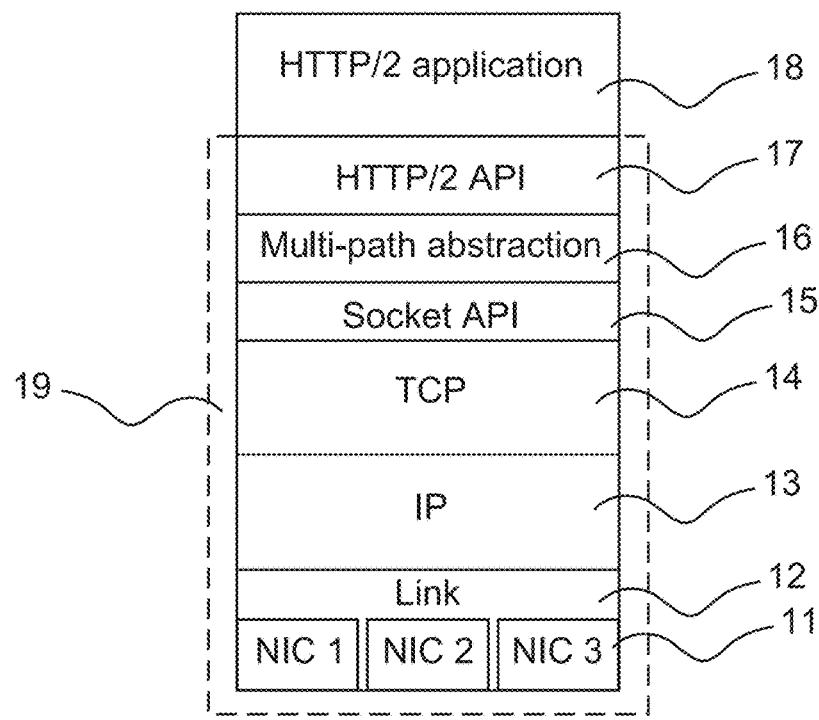
FIG. 3 shows a network protocol stack for implementation at a client device with the addition of a multi-path abstraction layer.

FIG. 3 shows a HTTP/2 client configured to implement multi-path technology. In particular, the client 10 supports multi-homing, so that each of the network interface cards (NIC) has its own IP address. The protocol stack of the HTTP/2 client 10 are further depicted on FIG. 3. From bottom to top, there are the physical layer 11 with three network interface cards NIC, the data link layer 12, the IP protocol layer 13 on the network layer of OSI reference model, the TCP layer 14 on transport layer of OSI reference model, the socket layer 15 on session layer of OSI model, the HTTP/2 layer API (Application Programming Interface) 17 on presentation layer of the OSI reference model and the HTTP/2 application layer 18 on the application layer of OSI reference model. The browser is arranged in the application layer 18. A multipath abstraction layer 16 is arranged between the HTTP/2 layer API 17 and the socket layer API 15. The API (function calls) of the HTTP/2 layer API 17 and the socket layer API 15 do not need to be changed in order to get a solution fully transparent for the application (e.g. the browser). The abstraction layer can hide the implementation details of a particular set of functionalities, allowing the separation of concerns to facilitate interoperability and platform independence. The different functionalities of the multi-path abstraction layer 16 are explained hereinafter.

When an abstraction layer is added in the network stack between HTTP/2 API and Socket API, the use of multi-homing technology is hidden and the application (e.g. the browser) does not need to be aware of its use. Therefore, there is no need to add this multi-homing feature in the application (e.g. the browser).

Figure 4:
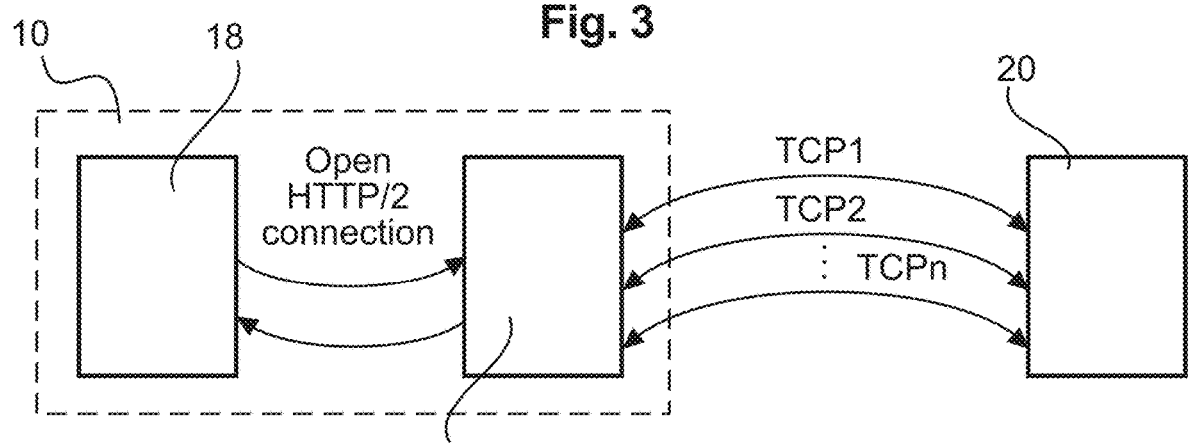
FIG. 4 shows an establishment of an HTTP/2 connection according to one embodiment.
Figure 5:
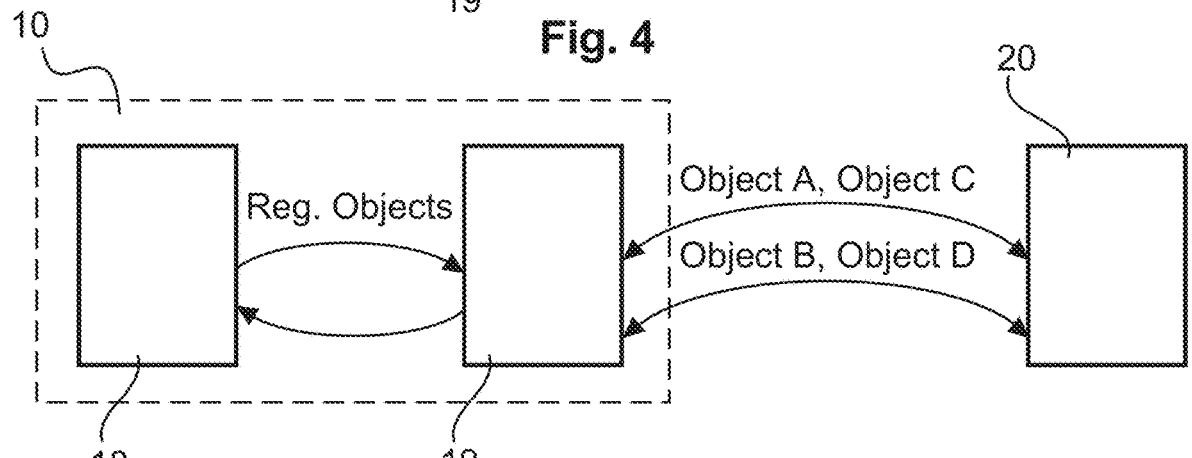
FIG. 5 shows the principle of retrieving different objects of the requested web site according to one embodiment.

First, the process of opening an HTTP/2 connection for a multi-path device is explained in connection with FIG. 4. For this purpose, the HTTP/2 client application program as exemplified with a browser, remains unchanged as the HTTP/2 API 17. What changes is the implementation of the API realized by the abstraction layer 16 that deals mostly with TCP socket management and the socket layer API 15. Whenever a connection is opened through the HTTP/2 API 17, the multi-path abstraction layer 16 establishes more than one HTTP/2 slave connection (at most one per available network interface, at least two corresponding to two selected network interfaces) through operating multi-home source routing. The HTTP/2 slave connections are opened in the form of TCP connections, corresponding to the transfer control protocol.

Selecting the right network interface for establishing outgoing TCP connections is possible through the socket layer API 15. It consists in binding the socket with the source IP address and then connecting with the target server 20.

For instance, HTTP/2 client 10 has a WLAN interface with IP address 10.0.1.100/24 and an LTE interface with IP address 12.145.30.10/24. The HTTP/2 client 10 wants to open a connection with the server 20 at target IP address 133.13.245.12. For implementing multi-path capability, the multi-path abstraction layer 16 opens two TCP connections to the target IP address 133.13.245.12, through binding the source IP address 12.145.30.10 to the target IP address and the other source IP address 10.0.0.100 to the target IP address, respectively. Note, that if the client 10 is equipped with more network interface cards NIC, which are connected to an Internet Service Provider ISP, then more than two TCP connections could be opened. This is schematically illustrated in FIG. 4

According to the routing table and following the "strong host" principle, the operating system in the HTTP/2 client 10 selects the source IP address as indicated through the socket API (bind( ) call) for the data packets to be delivered to the network interface card NIC associated with that IP address and will forward the packets to the corresponding default gateway 40 or 50 associated with the access network 100 and 200 respectively. Note that this is the upstream direction of the HTTP/2 client 10. For the traffic in downstream direction the server 20 has two separate connections. The expression "default gateway" is known in the field of routing technologies. The routing algorithm is that part of the network layer software which is responsible for deciding which output line an incoming packet should be transmitted on. As depicted in FIG. 2, the packets from client 10 which arrive at the residential gateway 40 are reformatted on the transport layer such that they are in the right format for transport via DSL lines or broadband cable. This reformatting happens in the default gateway. Therefore, the residential gateway address is entered in the routing table of the client device 10 for packet delivery via WLAN interface. For packet delivery via LTE interface, the default gateway is the gateway 50 from the mobile phone network operator and its address is implicit. The entry of a "default gateway address" in the routing table of the client 10 is part of the configuration process when installing the network software stack. For the above given example, the routing table would have the following entries:

Lte0: 12.145.30.10/24

W tan 0: 10.0.0.100/24 defgw 10.0.1.1

Once the TCP connections are established, they remain open with the server 20 espousing the principle that govern HTTP/2, unless an explicit Connection Close message is generated through the HTTP/2 protocol. Once this arrives at the multi-path abstraction layer 16, the corresponding sockets (i.e. the two TCP connections) are closed simultaneously. A new master HTTP/2 connection remains purely virtual and is mapped over a set of slave HTTP/2 connections as a set of source routed TCP connections (one per network interface). The settings attached to the master HTTP/2 connection are then associated to the slave HTTP/2 connections. Those settings can be sent unchanged (i.e. same settings for all slave connections) or could be modified considering each of the individual TCP connection capabilities.

Examples of settings which could be modified are SETTINGS_INITIAL_WINDOW_SIZE or SETTINGS_MAX_FRAME_SIZE parameters that could be dependent on the network interface associated with the TCP connection, as explained hereinafter.

In HTTP/2 the stream concept has been added to the specification. The definition of the meaning of the term "stream" is presented in chapter 5 of RFC 7540.

A "stream" is an independent, bidirectional sequence of frames exchanged between the client and server within an HTTP/2 connection. Streams have several characteristics:

a single HTTP/2 connection can contain multiple concurrently open streams, with either endpoint interleaving frames from multiple streams;

streams can be established and used unilaterally or shared by either the client or server;

streams can be closed by either endpoint.

the order in which frames are sent on a stream is significant. Recipients process frames in the order they are received. In particular, the order of HEADERS and DATA frames is semantically significant;

streams are identified by an integer. Stream identifiers are assigned to streams by the endpoint initiating the stream.

In particular, when the browser wants to load an object that is indicated in the index table of the web site that is visited, it requests establishment of a stream. Now, according to the proposal for each new HTTP/2 stream, the multi-path abstraction layer 16 selects one of the available sockets. Since a local address is bound to a socket, such socket is addressed with source IP address and port number. i.e. such socket is assigned to an individual TCP connection. The multi-path abstraction layer 16 selects the underlying TCP connection according to a load balancing strategy as described below, memorizes the association in the form of a stream identifier (Stream ID), Socket number (i.e. TCP connection) and/or HTTP/2 slave connection and forwards the stream messages over the selected TCP socket associated with the target server 20.

Another aspect of the proposal is to deliver over the established HTTP/2 slave connections a plurality of requests of resources to the server, wherein for a request of a resource a separate stream of data frames is established over a slave connection for which the stream of data frames is received back over the same slave connection via which the request of a resource had been transferred to the server.

It is also convenient if in a process of configuring the slave connections at least one HTTP/2 configuration settings parameter of the HTTP/2 connection is taken into consideration in such a way that the HTTP/2 configuration settings parameter represents the maximum limit and is greater or equal than the sum of the configuration settings parameters of the at least two slave connections. This can assure that the slave connections will not be overloaded and can reduce the risk of congestion.

Here, in particular the following configuration settings parameter are interesting: at least one of the HTTP/2 parameters SETTINGS_INITIAL_WINDOW_SIZE for stream-level flow control or SETTINGS_MAX_FRAME_SIZE for the largest data frame payload.

The distribution of streams is performed in the following manner:

Streams are distributed according to a load balancing strategy. One of such efficient strategies is called "weighted round robin". Each new stream is forwarded over the path (i.e. the TCP connection) that is the less loaded. This imposes the client 10 to get an idea about the available bandwidth. This is typically done through measuring the time between sending an HTTP request and getting the corresponding response. PING packets will be sent out to server 20 which the server 20 needs to answer immediately for measuring the minimal round-trip time RTT. Also, the HTTP/2 protocol supports the use of such PING packets.

For the scheduling operation at the abstraction layer 16 it is an embodiment to perform a simple round robin scheduling operation or a weighted round robin scheduling operation.

In a still further embodiment for the weighted round robin scheduling operation a load balancing strategy is applied in which a new stream is forwarded over the slave connection that is the less loaded.

In a still further embodiment for the weighted round robin scheduling operation a load balancing strategy is applied in which a new stream is forwarded over the slave connection that has the greatest HTTP/2 receiver window.

The stream numbering is associated with the master HTTP/2 connection, however, a stream ID is unique across all HTTP/2 slave connections.

In HTTP/2 the concept of "Stream Priority" was introduced. This involves the concepts of stream dependencies and stream weight. The application, requesting a new stream can associate with the stream a priority though indicating a parent stream (the parent stream is typically processed before its child(ren) stream(s)), the oldest parent being the "root" parent. In addition, a stream can be associated with a weight. This is used by the sender to allocate resources (whatever it is) according to the weight for sibling streams (i.e. streams having the same parent)

In HTTP/2 protocol, the priority weight associated with a stream typically is proportional to the sum of the weights associated with all other opened streams. This allows the server 20 to allocate resources as a function of the priority weight.

Since in HTTP/2 the concept of stream dependency is introduced, it is an embodiment to adapt this to the multi-path and multi-homing technology. What is recommended here is that a master streams dependency tree is attached to the HTTP/2 connection which is transposed into at least two dependency sub-trees corresponding to the at least two HTTP/2 slave connections, wherein all streams sent over the same slave connection compose one or several dependency sub-trees or have no dependency;

the relationships of all streams composing the dependency sub-tree is compatible with the master stream dependency, wherein;

if two streams are part of the same slave connection dependency sub-tree, the first stream that is hierarchically older than the second stream in the said HTTP/2 connection dependency tree remains older in the slave connection dependency sub-tree;

if two streams are part of the same slave connection dependency sub-tree, the first stream that is hierarchically identical than the second stream in the HTTP/2 connection dependency tree remains identical in the slave connection dependency sub-tree.

In addition to stream dependency, for all sibling streams (i.e. streams having the same parent), it is possible to allocate resources function of the stream's weight. When processing streams over multiple interfaces, the master HTTP/2 connection dependency tree being composed with several slave connection sub-trees (one per interface). For each stream, the attached weight can be recomputed for ensuring coherency according to the following: New weight=(stream's original weight/Sum all siblings original weights)*100.

With the multi-path capability being added according to the proposal, if stream dependency is used, in case of an explicit stream dependency, if the referenced stream is sent over one HTTP/2 slave connection and the dependent stream is supposed to be sent over an alternate slave connection, then the dependency level shall be removed.

Figure 6:
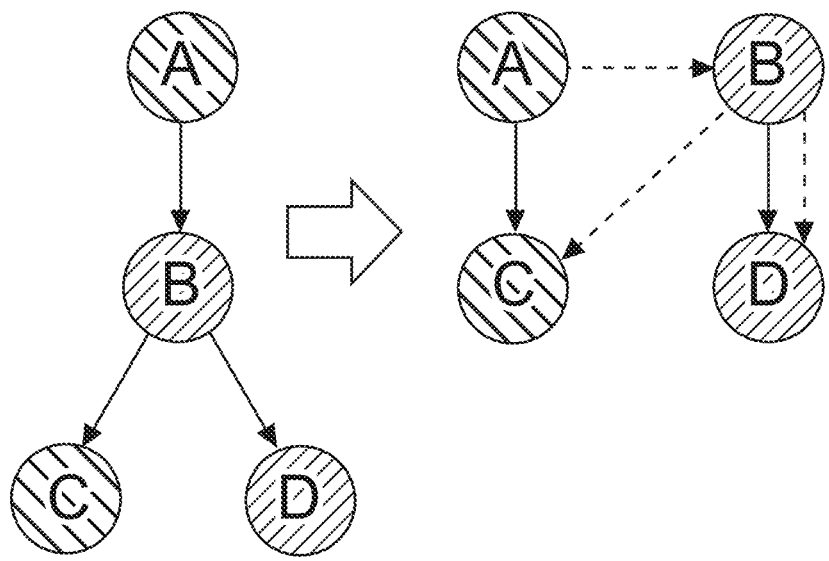
FIG. 6 shows the stream dependency tree conception according to HTTP/2 on the left side and the adapted version of such conception according to one embodiment on the right side where a simple round robin scheme is used for scheduling.

Let's consider for instance the FIG. 6 and a set of streams, labelled A to D that have been created in the ascendant order from A to D. The left tree represents an original dependency tree, wherein the stream A is processed with the highest priority, then the stream B and thereafter the streams C and D. Because the underlying multipath abstraction layer 16 manages several connections (in the presented example only two) then the original dependency tree needs to be split into subtrees as shown on the right side of FIG. 6. For each slave connection, the dependency (possibly several) sub-trees gather all streams that are sent over the corresponding connection. The two different shades in FIG. 6, indicate which stream will be sent over which slave connection. The lines (dash and plain) in the right part of FIG. 6 represent the dependence relations forming three dependency trees: the original dependency tree on the left belongs to the HTTP/2 master connection (dashed lines: A then B then C and D) and the two said secondary trees (plain lines), one per "slave" TCP connection (A then C) and (B then D).

In FIG. 6 it is assumed that the scheduling operation corresponds to a simple round robin scheme, where streams A, B, C and D will be sent in that order to the server 20. The round robin scheme makes stream A sent over the first slave TCP connection to the server 20 whereas stream B is sent over the second slave TCP connection to the server 20, stream C is sent over the first slave connection and finally stream D over the second slave connection. This is one example and the assumption about the original sending order is purely arbitrary as nothing imposes that order despite the dependence tree. Whatever the scheduling strategy of stream transmission is, it ends up with a set of streams to be sent over one TCP slave connection and another set of streams to be sent over the second TCP slave connection, each of these sets of streams having its own dependency tree.

An HTTP/2 stream is a flow of messages (composed themselves in frames) identified with the same stream ID. Typically an HTTP request message is coded as a HEADERS frame and sent as part of a stream. The corresponding HTTP response message is split into a HEADERS frame possibly followed by one or many payload frames belonging to the same stream. An HTTP/2 stream can be viewed as a HTTP transaction. A stream is a transaction related to the transmission of an object (image, video, audio, document, etc.). As a typical example, a client 10 initiates a stream transaction through sending a HEADERS frame gathering the parent stream identifier that stream depends on and the HTTP request itself in the Header Block Fragment. The server 20 may receive multiple stream frames in parallel. The priority information (as notified in the HEADERS frame for stream setting-up) is used by the server 20 to prioritize the way it manages the sending of its responses to the client(s) 10.

Figure 7:
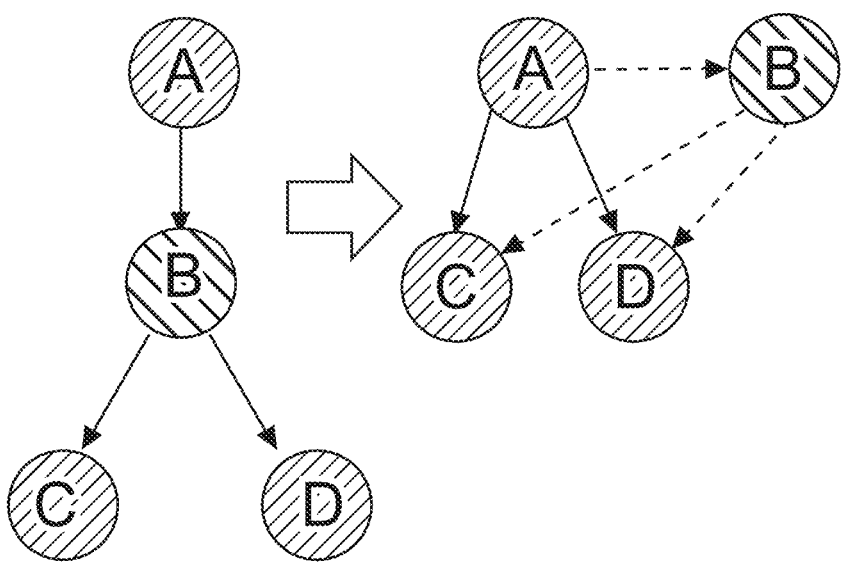
FIG. 7 shows the corresponding stream dependency conception with a scheduling operation based on a weighted round robin scheme on the right side.

In FIG. 6 the stream scheduling operation followed a simple round-robin scheme; however, the result may be different with a different load balancing strategy, an example is shown in FIG. 7. Assuming a weighted round-robin strategy for this example, the streams A, C and D will be sent over one slave connection whereas the stream B will be delivered over the alternate slave connection.

Although the original dependency tree is split into sub-trees, the dependencies as expressed by the application and attached to the HTTP/2 master connection request need to be memorized. A software implementation illustrates how this can be performed as a task of the multi-path abstraction layer 16 and is presented hereinafter with the pseudo-code for processing the dependencies issued from the master HTTP/2 connection:

```
Int lastStreamID=1; //a HTTP2 client uses odd numbering
Hashtable <integer, HTTP2_stream> sessionStreams = new
Hashtable <integer, HTTP2_stream>( );
// request sending a new stream
HTTP2_Request (string header, int parentStreamID)
    {
    HTTP2_stream ns;
    Int pID;
    ns.header=header;
    ns.streamID = (lastStreamID+=2);
    ns.masterParentID = parentStreamID;
    ns.secondaryParentID=ROOT;
    ns.slaveConnection=HTTP2_selectSlaveConnection( );
pID=parentStreamID;
While((pID   !=ROOT)   &&   (ns.slaveConnection   !=
(HTTP2_selectSlaveConnection(pID))))
        {
        // search the next parent that is attached to the same
        slave connection
        pID = sessionsStreams.find(pID).masterParentID;
        }
ns.secondParentID=pID;
sessionsStream.add(ns.streamID, ns); // add the new stream in the hash
table HTTP2_Send(ns);
}
```

The function HTTP2_Request is called whenever a stream is created. In the list sessionStreams all streams associated with a stream identifier are gathered. The HTTP2_selectSlaveConnection function permits either to attach a slave connection to a stream according to a load balancing strategy as explained or to select a slave connection already attached to a stream given its stream identifier.

Considering the example of FIG. 6, the pseudo-code permits to construct a list of streams, giving:
  one stream for which the master parent ID is root: A
  one stream for which the master parent ID is A: B
  two streams for which the master parent ID is B: C and D
  two streams for which the secondary parent ID is root: A and B
  one stream for which the secondary parent ID is A: C
  one stream for which the secondary parent ID is B: D.

Figure 8:
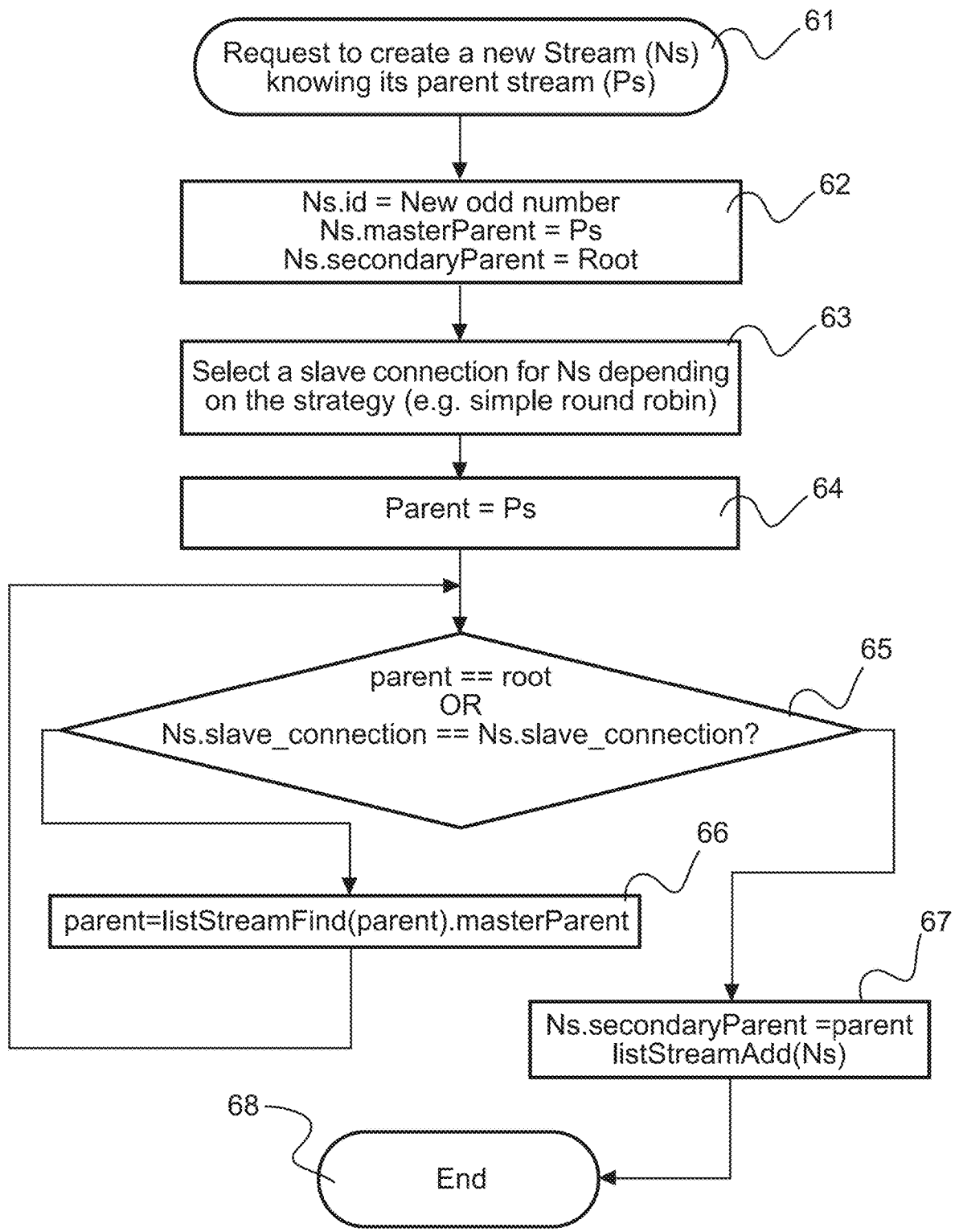
FIG. 8 is a flowchart of an exemplary embodiment showing flow creation and flow steering.

Such implementation is further illustrated with a corresponding flow chart in FIG. 8. The program starts in step 61 with a HTTP/2 Request. In step 62, the new stream ID is assigned as well as the entries for the master parent and secondary parent dependency. In step 63, the scheduling operation is carried out where a slave connection is assigned to the new stream according to a load balancing strategy, e.g. simple round robin. Step 64 assigns a parent to the parent stream Ps. In step 65, the next parent that is attached to the same slave connection is searched. If such entry is found, then the new stream will be added to the hash table in step 67. If no such entry is found, then a new list for this parent is created in step 66. The program ends in step 68.

In order to be compliant with HTTP/2 as specified in RFC 7540 section 9.1, each of the slave HTTP/2 connections protected using TLS is associated with a separate client's certificate.

For all sibling streams (i.e. streams having the same parent), it is possible to allocate resources function of the stream's weight that is optionally indicated by the application (e.g. the browser).

As depicted above, when processing streams over multiple interfaces, the original dependency tree is composed with several sub-trees (one per interface). For each stream, the attached weight is recomputed for ensuring coherency. Several methods are possible, amongst which one is defined as follows:
  compute the original (considering the original dependency tree) proportion of each stream as the new weight: New Weight=(stream's weight/Sum (all siblings weight))*100;
  if there is no weight attached to a stream in the original dependency tree, allocate 100 as the new weight;
  in each of the dependency sub-trees, allocate to each stream the computed NewWeight as the weight.

With such heuristics, an homogeneity in the stream weight notation can be assured.

As mentioned before, the flow control in HTTP/2 is based on the control of a receiver window size. It is applicable to data frames. The receiver communicates the initial window size to the sender. The latter reduces the window according to its transmissions and the former advertises the new window size either after having received one or more data frames or at any time indeed. There are two windows which play a role: one dedicated to a stream and one dedicated to the connection.

Another aspect of the proposal concerns to use a hybrid flow control process in which the scheduling of streams is done based on a load balancing strategy combined with the HTTP2/receiver window wherein it is checked if the selected slave connection (according to e.g. based on said simple round robin scheduling operation) has a receiver window size above a minimum threshold. If this is not the case, there is a try to find a slave connection which has a receiver window above or equal to said minimum threshold.

In a variant, said list of receiver window sizes of said slave connections is sorted in ascending or descending order in a function of the scheduling operation. This accelerates the search algorithm.

On the client side, regarding connection flow control, it applies to the master virtual connection. What the multi-path adaptation layer 16 does according to the proposal is that it advertises the receiver window (WINDOW_UPDATE) of each HTTP/2 slave connection in a way that the sum of all receiver windows of all slave connections remains less or equal to the master window size.

In another embodiment of the present proposal, the available stream control credit of each connection is used instead for flow control instead of a load balancing strategy with the aim of ensuring that newly created streams are mapped on those connections having enough credit. This variation is implemented as follows. Upon creation, each slave connection TCP1-TCPn has an initial local window. This window is updated continuously as data frames are received from the server 20 and as WINDOW_UPDATE messages are sent by the client 10. The multipath abstraction layer 16 compares the current windows of each slave connection TCP1-TCPn every time a new stream is created and decides to assign the new stream to the slave connection having TCP1-TCPn the greatest current window (hence stream control credit).

This scheme works because the client 10 increments the window every time it consumes data (downstream direction). If for some reason the client 10 slows down consuming data (for example due to the web browser navigating to a different page on a website), the window will drop to a small value, ultimately causing the server 20 to stop sending data. By creating streams on slave connections TCP1-TCPn having stream control credits available, it can be ensured that the server 20 will be able to transmit the desired data over the newly created stream.

Figure 9:
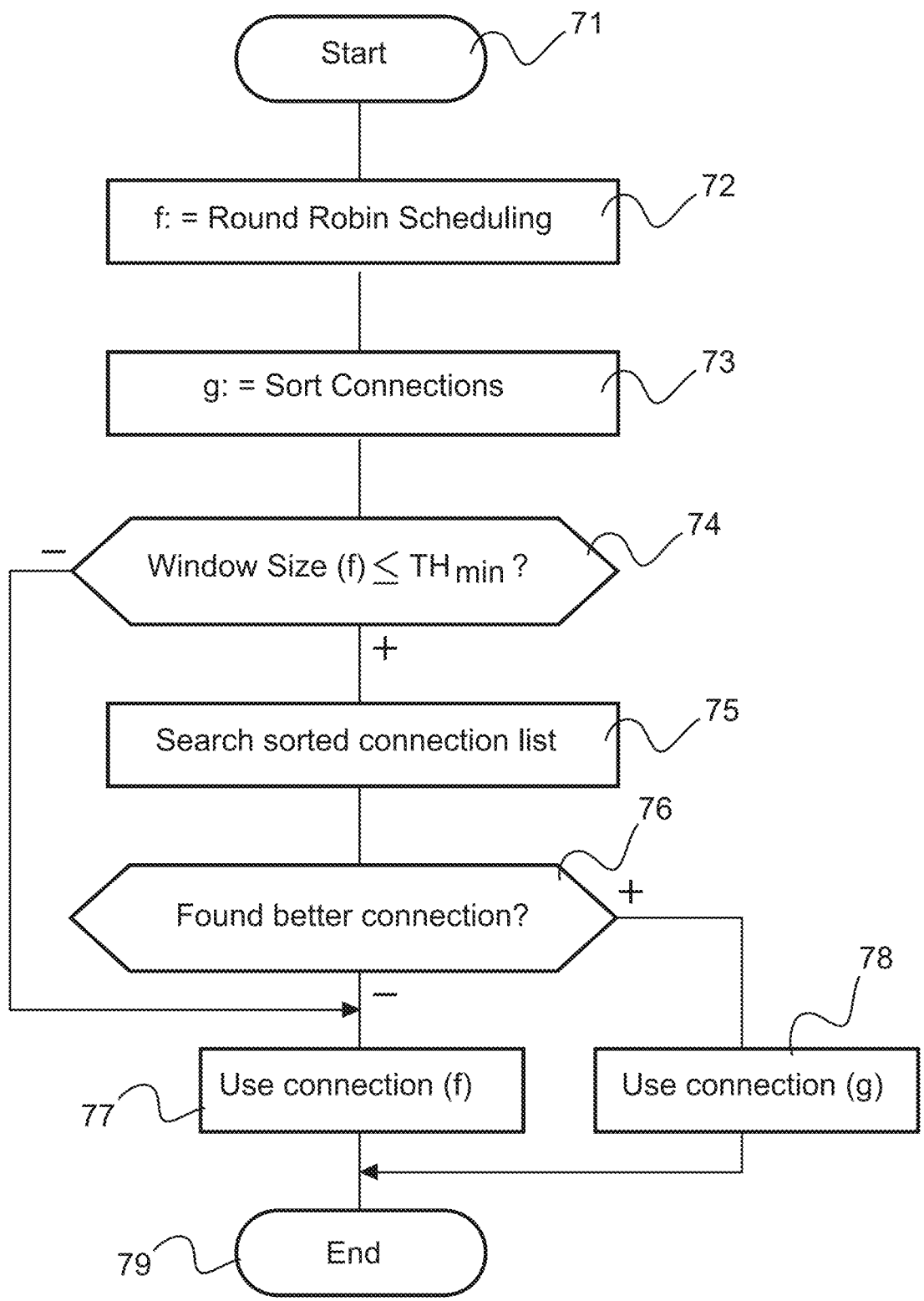
FIG. 9 shows a flowchart for another embodiment where a hybrid traffic steering is used mixing flow control based on window sizes and a load balancing strategy are mixed.

A further variation is disclosed, with reference to the flow chart in FIG. 9 where the flow control window sizes are used similar to the first mentioned embodiment but mixed with a load balancing strategy.

Let f be the function that selects the slave connection TCP1-TCPn based on a round robin scheme. Let g be the function sorting the slave connections TCP1-TCPn according to the current window sizes in ascending order.

The program starts in step 71. In step 72 the program performs function f where the slave connection TCP1-TCPn according to the use of a simple round robin scheme is selected. In step 73 the sorting function g is carried out. Then it follows in query 74 a check if the slave connection TCP1-TCPn chosen by function f has a window size below a minimum threshold $TH_{min}$, meaning there is a risk that the server 20 cannot send data at a reasonable speed. If yes, it follows a try in step 75 to find a slave connection TCP1-TCPn in the sorted list according to function g until a slave connection TCP1-TCPn is found with a window size above the minimum threshold $TH_{min}$, or the end of the list is reached. This is performed in step 76. If none of the connections in the sorted list meets the criterion, finally the connection that was selected by function f is taken in step 77. If a better connection is found, it will be used in step 78. The program ends in step 79.

By using such an algorithm, it is ensured that all slave connections (TCP1-TCPn) are used except when they have a flow control issue. It is noted that the presented different embodiments are transparent to the server 20.

A few further implementation details will be described hereinafter.

Looking at an existing HTTP/2 API 17 (as provided by Node.JS for javascript), the solution can perfectly be implemented transparently. The http2.connect( ) function is used to create a HTTP/2 session. The implementation however relies on the multi-path abstraction layer 16 for supporting the proposals described in the previous sections for connecting through multiple available network interfaces NIC the client 10 to a server 20.

It is noted that for creating the sockets, the socket.connect (options[, connectListener]) method can be used as it allows forcing the source path through the right network interface. IP addresses of the network interfaces NIC can be retrieved through using the os.networkIntrfaces( ) method.

The second Node.js class that is impacted is the Http2session. All APIs (functions) changing the state of the connection associated with a Http2session object need to have their implementation updated relying on the multi-path abstraction layer 16 as to changing the state of all [HTTP/2/TCP] connections supported by the session accordingly. The function http2session.request(headers[options]) is used to create a HTTP stream and relies on the multi-path abstraction layer 16 for supporting stream load balancing over the sockets (i.e. the TCP connections) associated with the session and to support stream dependency subtrees.

In another embodiment, the notion of an HTTP/2 connection is detached from the socket to which the TOP connection is bound. This permits to associate an HTTP/2 connection with several TOP connections in case of multihoming (Le supporting multiple network interfaces).

Accordingly, if TLS is used and this is almost the standard, since some of the most commonly used browsers use the https protocol by default, it is proposed to authorize several TOP connections connecting a client 10 with a server 20, each having a different source IP address. The HTTP/2 connection will be identified by the server 20 through the unique client's certificate.

Alternatively, such master connection could be identified through using a new parameter in the SETTINGS frame of HTTP/2 as for instance HTTP_CONNECTION_ID_LOW and HTTP_CONNEOTION-ID_HIGH, the value being a 64 bits identifier. For instance, the MAC address of one of the network interface cards NIC associated with the connection could be used.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the method and device described. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

S Although certain embodiments only of the disclosure have been described herein, it will be understood by any person skilled in the art that other modifications, variations, and possibilities of the disclosure are possible. Such modifications, variations and possibilities are therefore to be considered as falling within the spirit and scope of the disclosure and hence forming part of the disclosure as herein described and/or exemplified.

The flowchart and/or block diagrams in the Figures illustrate the configuration, operation and functionality of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s), It should also be noted that, in some alternative implementations, the functions noted in the block may occur out of the order noted in the figures. For example, two blocks shown in succession may, in fact, be executed substantially concurrently, or the blocks may sometimes be executed in the reverse order, or blocks may be executed in an alternative order, depending upon the functionality involved. It will also be noted that each block of the block diagrams and/or flowchart illustration, and combinations of the blocks in the block diagrams and/or flowchart illustration, can be implemented by special purpose hardware-based systems that perform the specified functions or acts, or combinations of special purpose hardware and computer instructions. While not explicitly described, the present embodiments may be employed in any combination or sub-combination.

The invention claimed is:

1. A client device, comprising:
   at least two network interfaces for sending messages to a server based on a transfer protocol;
   at least one processor configured for:
   upon requests for resources from said server, establishing a master connection with said server at an application layer by creating at least two slave connections at a network layer, wherein each slave connection is bound to one of said at least two network interfaces; and
   performing a scheduling operation for distributing requests to said server over the at least two slave connections.

2. The client device according to claim 1, wherein a slave connection is a TCP connection.

3. The client device according to claim 1, wherein, over the established master connection, a plurality of requests of resources are delivered to the server and wherein, for a request of a resource, a separate stream of data is established when the request of the resource arrives at the server.

4. The client device according to claim 3, wherein the stream of data is received back over the same slave connection through which the request of the resource has been transferred to the server.

5. The client device according to claim 1, wherein the scheduling operation is a simple round robin scheduling operation or a weighted round robin scheduling operation.

6. The client device according to claim 5, wherein, when the scheduling operation is a weighted round robin scheduling operation, a load balancing strategy is applied wherein a new stream is forwarded over the slave connection that is less loaded.

7. The client device according to claim 5, wherein, in a process of configuring the slave connections, at least one configuration settings parameter of the master connection is considered so that the configuration settings parameter is at least equal to a sum of the configuration settings parameters of the at least two slave connections.

8. The client device according to claim 7, wherein the configuration settings parameter is at least one of following HTTP/2 parameters:
   SETTINGS_INITIAL_WINDOW_SIZE for stream-level flow control or
   SETTINGS_MAX_FRAME_SIZE for the largest data frame payload.

9. The client device according to claim 1, wherein the master connection and the at least two slave connections are HTTP/2 connections.

10. The client device according to claim 1, wherein a master streams dependency tree is attached to the master connection which is transposed into at least two dependency sub-trees corresponding to the at least two slave connections, wherein
    all streams sent over the same slave connection compose one or several dependency sub-trees or have no dependency; and
    relationship of all streams composing the dependency sub-tree is compatible with the master stream dependency, wherein;
    on a condition that a first stream and a second stream are part of the same slave connection dependency sub-tree, the first stream that is hierarchically older than the second stream in the said master connection dependency tree remains older in the same slave connection dependency sub-tree; and
    on a condition that a first stream and a second stream are part of the same slave connection dependency sub-tree, the first stream that is hierarchically identical to the second stream in the master connection dependency tree remains identical in the same slave connection dependency sub-tree.

11. The client device according to claim 1, wherein one of the at least two network interfaces is a WLAN interface and another network interface is a mobile communication interface.

12. A method for data communication between a client device and a server based on a transfer protocol, wherein the client device is equipped with at least two network interfaces, said method comprising:
    upon requests for resources from said server, establishing a master connection with said server at an application layer by creating at least two slave connections at a network layer, wherein each slave connection is bound to one of said at least two network interfaces; and
    performing a scheduling operation for distributing requests to said server over the at least two slave connections.

13. The method according to claim 12, wherein a slave connection is a TCP connection.

14. The method according to claim 12, wherein, over the established master connection, a plurality of requests of resources are delivered to the server and wherein, for a request of a resource, a separate stream of data is established when the request of the resource arrives at the server.

15. The method according to claim 14, wherein the stream of data is received back over the same slave connection through which the request of the resource has been transferred to the server.

16. The method according to claim 12, wherein the scheduling operation is a simple round robin scheduling operation or a weighted round robin scheduling operation.

17. The method according to claim 16, wherein, when the scheduling operation is a weighted round robin scheduling operation, a load balancing strategy is applied wherein a new stream is forwarded over the slave connection that is less loaded.

18. The method according to claim 16, wherein, in a process of configuring the slave connections, at least one configuration settings parameter of the master connection is considered so that the configuration settings parameter is at least equal to a sum of the configuration settings parameters of the at least two slave connections.

19. The method according to claim 18, wherein the configuration settings parameter is at least one of following HTTP/2 parameters:
SETTINGS_INITIAL_WINDOW_SIZE for stream-level flow control or
SETTINGS_MAX_FRAME_SIZE for the largest data frame payload.

20. The method according to claim 12, wherein the master connection and the at least two slave connections are HTTP/2 connections.

21. The method according to claim 12, wherein a master streams dependency tree is attached to the master connection which is transposed into at least two dependency sub-trees corresponding to the at least two slave connections, wherein
all streams sent over the same slave connection compose one or several dependency sub-trees or have no dependency; and
relationship of all streams composing the dependency sub-tree is compatible with the master stream dependency, wherein;
on a condition that a first stream and a second stream are part of the same slave connection dependency sub-tree, then the first stream that is hierarchically older than the second stream in the said master connection dependency tree remains older in the same slave connection dependency sub-tree; and
on a condition that a first stream and a second stream are part of the same slave connection dependency sub-tree, then the first stream that is hierarchically identical to the second stream in the master connection dependency tree remains identical in the same slave connection dependency sub-tree.

22. The method according to claim 12, wherein one of the at least two network interfaces is a WLAN interface and another network interface is a mobile communication interface.

23. A computer program product at least one of downloadable from a communication network and recorded on a non-transitory computer readable medium readable by at least one of computer and executable by a processor, comprising program code instructions for implementing a method for data communication between a client device and a server based on a transfer protocol, wherein the client device is equipped with at least two network interfaces, said method comprising:
upon requests for resources from said server, establishing a master connection with said server at an application layer by creating at least two slave connections at a network layer, wherein each slave connection is bound to one of said at least two network interfaces; and
performing a scheduling operation for distributing requests to said server over the at least two slave connections.

24. A non-transitory program storage device, readable by a computer, tangibly embodying a program of instructions executable by the computer to perform a method for data communication between a client device and a server based on a transfer protocol, wherein the client device is equipped with at least two network interfaces, said method comprising:
upon requests for resources from said server, establishing a master connection with said server at an application layer by creating at least two slave connections at a network layer, wherein each slave connection is bound to one of said at least two network interfaces; and
performing a scheduling operation for distributing requests to said server over the at least two slave connections.

* * * * *